United States Patent
Chu et al.

(10) Patent No.: US 9,208,607 B2
(45) Date of Patent: Dec. 8, 2015

(54) APPARATUS AND METHOD OF PRODUCING 3D MODEL

(75) Inventors: Chang Woo Chu, Daejeon (KR); Il Kyu Park, Daejeon (KR); Young Mi Cha, Busan (KR); Ji Hyung Lee, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 569 days.

(21) Appl. No.: 13/620,505

(22) Filed: Sep. 14, 2012

(65) Prior Publication Data

US 2013/0207966 A1 Aug. 15, 2013

(30) Foreign Application Priority Data

Feb. 15, 2012 (KR) ........................ 10-2012-0015325

(51) Int. Cl.
*G06T 17/00* (2006.01)
(52) U.S. Cl.
CPC ............. *G06T 17/00* (2013.01); *G06T 2210/56* (2013.01)
(58) Field of Classification Search
None
See application file for complete search history.

(56) References Cited

U.S. PATENT DOCUMENTS

| 7,257,249 B2 * | 8/2007 | Farsaie ........................ 382/154 |
| 2009/0086047 A1 * | 4/2009 | Suehiro ..................... 348/222.1 |
| 2010/0209013 A1 | 8/2010 | Minear et al. |
| 2010/0310154 A1 | 12/2010 | Barrois et al. |

OTHER PUBLICATIONS

Yangyan Li et al, "GlobFit: Consistently Fitting Primitives by Discovering Global Relations", ACM Transactions on Graphics, Proceedings of SIGGRAPH, 2011, p. 52, vol. 30, Issue 4.

* cited by examiner

*Primary Examiner* — Said Broome

(57) ABSTRACT

Disclosed are an apparatus and a method of producing a 3D model in which a 3D model having a static background is produced using a point cloud and an image obtained through 3D scanning. The apparatus includes an image matching unit for producing a matched image by matching a point cloud obtained by scanning a predetermined region to a camera image obtained by photographing the predetermined region; a mesh model processing unit for producing an object positioned in the region as a mesh model; and a 3D model processing unit for producing a 3D model for the object by reflecting texture information obtained from the matched image to the mesh model. The disclosed may be used for a 3D map service.

19 Claims, 7 Drawing Sheets

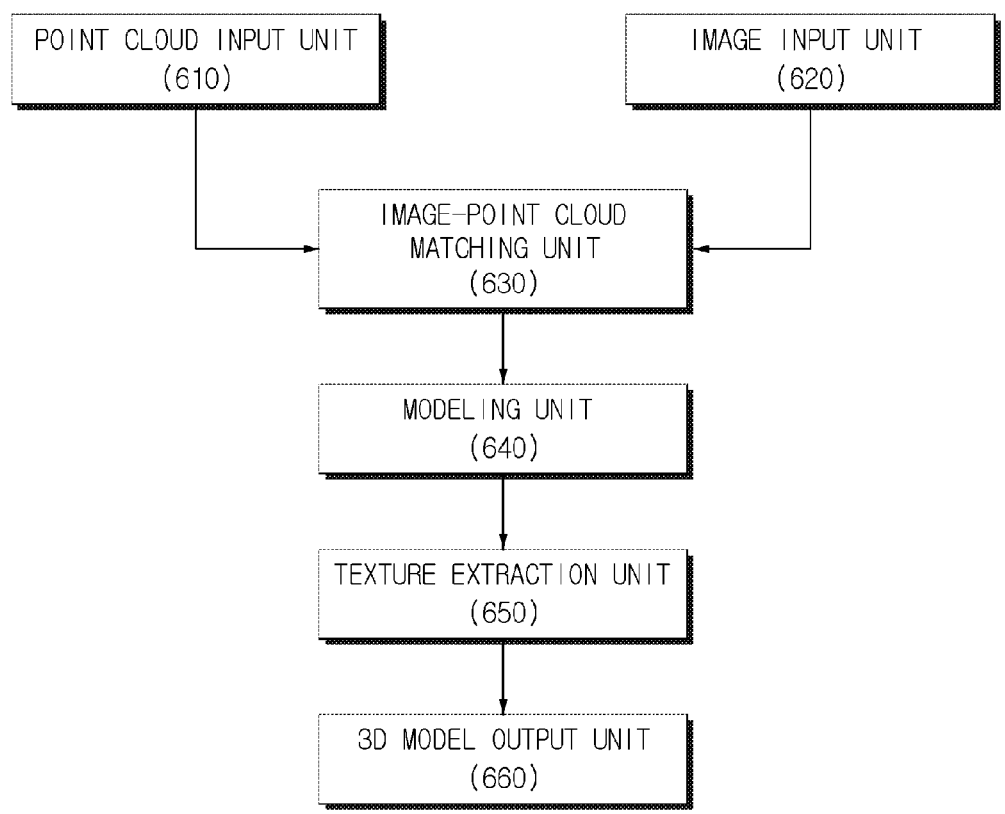

APPARATUS AND METHOD OF PRODUCING 3D MODEL

CROSS-REFERENCE TO RELATED APPLICATIONS

This application claims priority to and the benefit of Korean Patent Application No. 10-2012-0015325 filed in the Korean Intellectual Property Office on Feb. 15, 2012, the entire contents of which are incorporated herein by reference.

TECHNICAL FIELD

The present invention relates to an apparatus and a method of producing a 3D model, and more particularly, to an apparatus and a method of producing a 3D model by using a point cloud.

BACKGROUND ART

According to the release of smart phones, positioning information service which was available in an environment allowing use of a PC or a notebook computer has been developed and thus enables a user to easily search for a position of the user and information on a neighboring area anytime and anywhere. Google uses satellite images, and a portal site including a domestic portal site, such as Daum, uses aerial photographs for a map service and also provides a service enabling a user to look around a street by using panorama images. In the meantime, Microsoft disclosed the Photosynth service in which pictures shared through the Internet are searched and collected and a photography position, a photography direction, and 3D coordinates of a main feature point of each image are calculated, so that the collected pictures are not displayed in a form of a thumbnail view in which the collected pictures are simply arranged, but a user can view the collected images as if the user actually navigates the place of the collected pictures. Several universities have conducted research for producing a 3D model, as well as 3D coordinates of the feature point, by expanding the Photosynth service. Google provides a 3D map service by uploading a 3D model modeled using a 3D modeling tool, such as Google Sketchup, and collects 3D data of an actual street by using a 3D scanner. As described above, various methods have been attempted in order to expand an existing map service using an image to a 3D map service.

A conventional method of producing a 3D model having a static background includes a manual operation using computer graphics software, an image-based modeling method using multiple images, etc.

A method of producing a 3D model by using computer graphics professional software, such as Maya and 3D Max, by a skillful designer may produce a detailed model by using various functions provided in the software. However, the method has disadvantages in that a quality of a 3D model and a time for producing a 3D model may be different depending on the ability of a designer and there is no method of securing geometrical accuracy with an object, such as an actually existing building.

The image-based modeling method using multiple images calculates a camera matrix and 3D coordinates of a feature point by performing camera self-calibration using corresponding points between many images, like the Photosynth. In this case, because the calculated 3D coordinates are not dense, the image-based modeling method may produce a 3D mesh by densely spreading 3D points with the points as an initial value or may manually model a 3D mesh through a user's interaction by using a camera matrix. The image-based modeling method may produce a relatively geometrically accurate 3D model compared to a model manually produced using computer graphics software, and may produce a realistic model because it is possible to extract a texture from an image. However, the image-based modeling method has a problem in that the accuracy of a model is dependent on image resolution.

SUMMARY OF THE INVENTION

The present invention has been made in an effort to provide an apparatus and a method of producing a 3D model, in which a 3D model having a static background is produced by using a point cloud and an image obtained through 3D scanning.

An exemplary embodiment of the present invention provides an apparatus for producing a 3D model, including: an image matching unit for producing a matched image by matching a point cloud obtained by scanning a predetermined region to a camera image obtained by photographing the predetermined region; a mesh model processing unit for producing an object positioned in the region as a mesh model; and a 3D model processing unit for producing a 3D model for the object by reflecting texture information obtained from the matched image to the mesh model.

The mesh model processing unit may include: an image overlapper for producing an overlapping image by overlapping the point cloud on the matched image; a user's input processor for detecting user's input related to the object from the overlapping image; a coordinate information processor for extracting coordinate information related to selected user's input from the point cloud; and a coordinate based model generator for producing the mesh model based on the coordinate information.

The image overlapper may produce the overlapping image by using a camera matrix obtained in the matching of the camera image and the point cloud.

The image overlapper may produce the overlapping image by orthographically projecting the camera image by using a graphic library and perspectively projecting the point cloud by using a camera matrix obtained in the matching of the camera image and the point cloud.

The coordinate information processor may include: a point group gatherer for collecting point groups positioned within a predetermined distance from the selected input; and a 3D coordinate processor for extracting 3D coordinate information on a vertex factor as the coordinate information by using the point group.

The image matching unit may include: a first computing module for calculating relation information on relation between the camera image and the point cloud by recognizing markers arranged in the region; and a first image generator for producing the matched image based on the relation information.

The apparatus for producing the 3D model may further include a camera image obtainment unit for simultaneously obtaining the camera image when obtaining the point cloud by using a camera attached to a scanner.

The image matching unit may include: a appointing module for designating a correspondence relation between a feature point of the camera image and a feature point of the point cloud; a second computing module for calculating a camera matrix based on the correspondence relation; a mapping relation processor for setting a mapping relation between the camera image and the point cloud based on the camera matrix; and a second image generator for producing the matched image based on the mapping relation. The mapping relation processor may set 2D coordinates of each point of the camera image as the mapping relation by multiplying the camera matrix by 3D coordinates of each point of the point cloud.

The apparatus for producing the 3D model may further include a texture information production unit for generating the texture information. The texture information production unit may include: a texture image acquisitor for obtaining a texture image to be reflected to each face of the mesh model from the matched image; and a distortion remover for generating the texture information by removing perspective distortion from the texture image. The texture image acquisitor may include: an image selector for, when an angle between a normal line vector in one face of the mesh model and a view vector of a camera conforms to a predetermined reference, selecting one face of the matched image related to the view vector from the matched image; and a image gaining module for obtaining the texture image from the selected one face of the matched image.

The apparatus for producing the 3D model may further include a point cloud production unit for generating the point cloud by 3D scanning the region.

The mesh model processing unit may produce the object as the mesh model by intuitively modeling the object through a user's interaction.

Another exemplary embodiment of the present invention provides a method of producing a 3D model, including: image matching by which a matched image is produced by matching a point cloud obtained by scanning a predetermined region to a camera image obtained by photographing the predetermined region; mesh model production by which an object positioned in the region is produced as a mesh model; and 3D model production by which a 3D model for the object is produced by reflecting texture information obtained from the matched image to the mesh model.

The mesh model production may include: image overlapping by which an overlapping image is produced by overlapping the point cloud to the matched image; user's input detection by which user's input related to the object is detected from the overlapping image; coordinate information extraction by which coordinate information related to selected input selected from the user's input from the point cloud; and coordinate based model production by which the mesh model is produced based on the coordinate information.

The image overlapping may include producing the overlapping image by using a camera matrix obtained in the matching of the camera image and the point cloud.

The image overlapping may include producing the overlapping image by orthographically projecting the camera image by using a graphic library and perspectively projecting the point cloud by using a camera matrix obtained in the matching of the camera image and the point cloud.

The coordinate information extraction may include: point group collection by which point groups positioned within a predetermined distance from the selected input are collected; and point group based coordinate extraction by which 3D coordinate information on a vertex factor is extracted as the coordinate information by using the point group.

The image matching may include: relation information calculation by which relation information about relation between the camera image and the point cloud is calculated by recognizing markers arranged in the region; and relation based image production by which the matched image is produced based on the relation information.

The method of producing the 3D model may further include camera image obtainment by which the camera image is simultaneously obtained when the point cloud is obtained by using a camera attached to a scanner.

The image matching may include: feature point relation designation by which a correspondence relation between a feature point of the camera image and a feature point of the point cloud is designated; camera matrix calculation by which a camera matrix is calculated based on the correspondence relation; mapping relation setting by which a mapping relation between the camera image and the point cloud is set based on the camera matrix; and mapping relation based image production by which the matched image is produced based on the mapping relation. The mapping relation setting may include setting 2D coordinates of each point of the camera image as the mapping relation by multiplying the camera matrix by 3D coordinates of each point of the point cloud.

The method of producing the 3D model may further include texture information generation by which the texture information is generated. The texture information generation may include: texture image obtainment by which a texture image to be reflected to each face of the mesh model is obtained from the matched image; and perspective distortion removal by which the texture information is generated by removing perspective distortion from the texture image. The texture image obtainment may include: image selection by which, when an angle between a normal line vector in one face of the mesh model and a view vector conforms to a predetermined reference, one face of the matched image related to the view vector is selected from the matched image; and selected image based obtainment by which the texture image is obtained from the selected one face of the matched image.

The method of producing the 3D model may further include point cloud generation by which the point cloud is generated by 3D scanning the region.

The mesh model production may include producing the object as the mesh model by intuitively modeling the object through a user's interaction.

The present invention may achieve the following effects by producing a 3D model having a static background by using a point cloud and an image obtained through 3D scanning. First, the present invention shows an image and a point cloud to a user by matching a mass 3D point cloud and an image and overlapping the point cloud on the matched image, visually and intuitively displays a part to be 3D modeled, and represents a modeling result, so that it is possible to easily produce a 3D model. Second, the image is matched with the point cloud, so that it is possible to produce a realistic texture on the 3D model. Third, it is possible to provide the method of producing a 3D model in which accuracy and reality of the 3D model are improved compared to the conventional method, so that the present invention may be widely used for a 3D map service, as well as the reverse engineering based on the method.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 is a diagram illustrating a 3D modeling system using a point cloud and an image.

Figure 1:
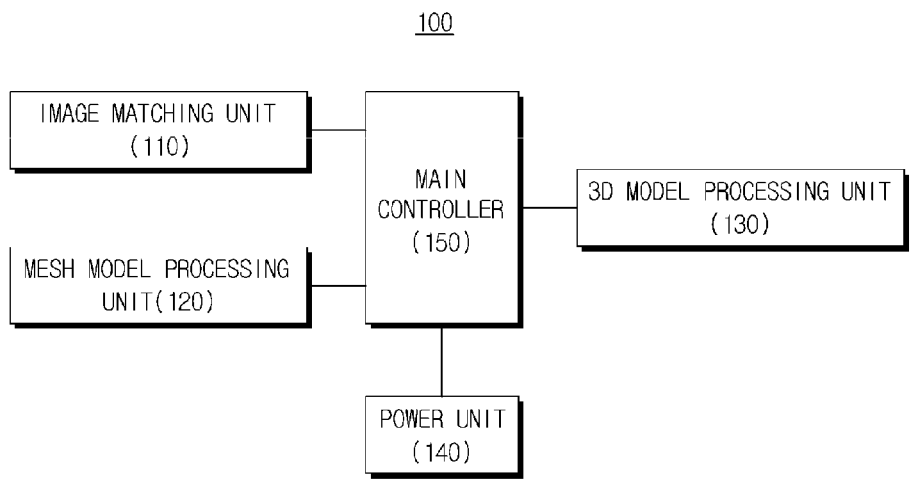
FIG. 1 is a block diagram schematically illustrating a 3D model production apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the following description and accompanying drawings, substantially like elements are designated by like reference numerals, so that repetitive description will be omitted. In the following description of the present invention, a detailed description of known functions and configurations incorporated herein will be omitted when it may make the subject matter of the present invention rather unclear. An exemplary embodiment of the present invention will be described below, but the technical spirit of the present invention is not limited thereto and may be modified and variously implemented by those skilled in the art.

Figure 2:
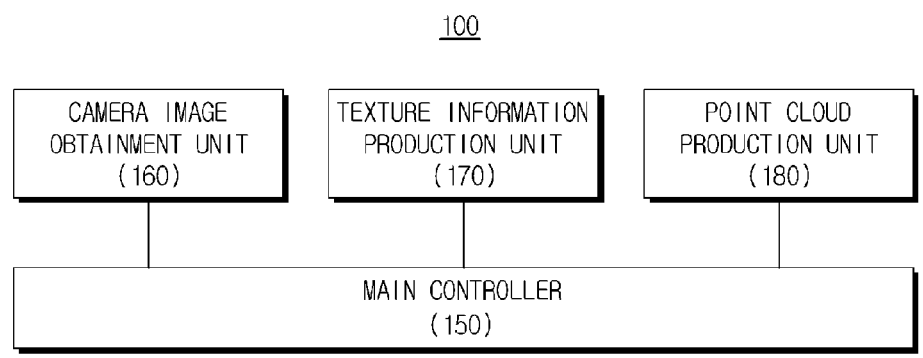
FIG. 2 is a block diagram schematically illustrating a construction added to the 3D model production apparatus illustrated in FIG. 1.
Figure 3A:
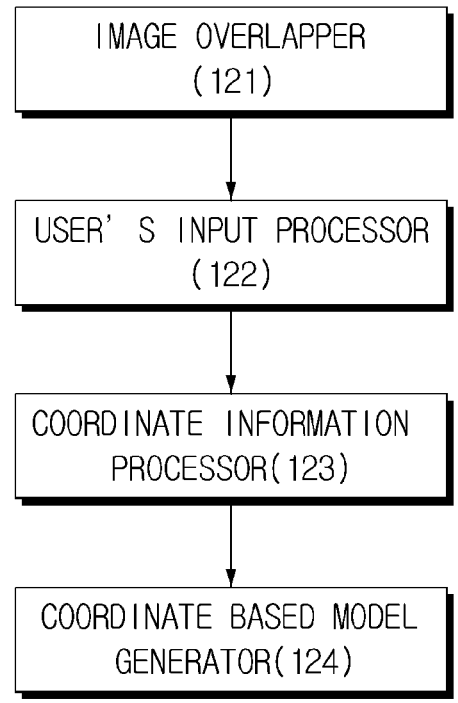
FIGS. 3A and 3B are block diagrams concretely illustrating a mesh model processing unit illustrated in FIG. 1.
Figure 3B:
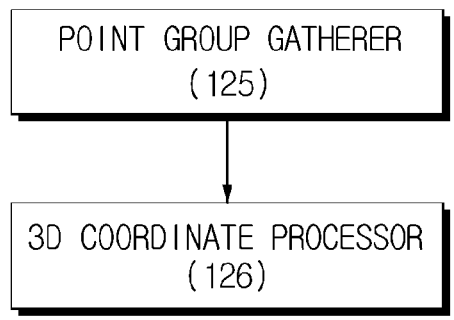
Figure 4A:
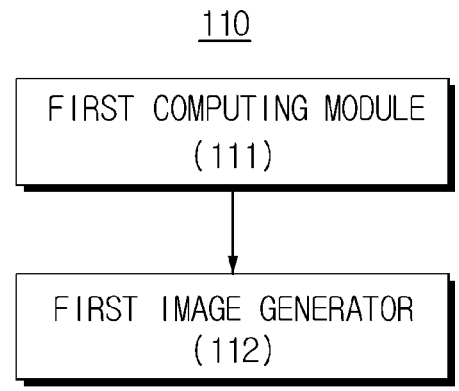
FIGS. 4A and 4B are block diagrams concretely illustrating an image matching unit illustrated in FIG. 1.
Figure 4B:
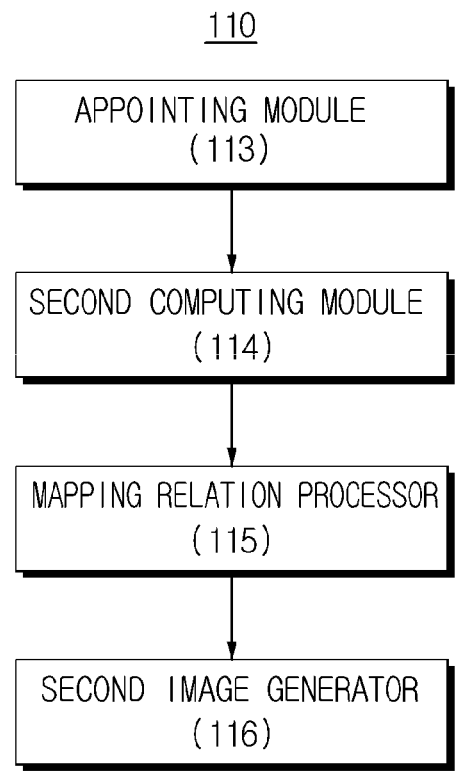
Figure 5A:
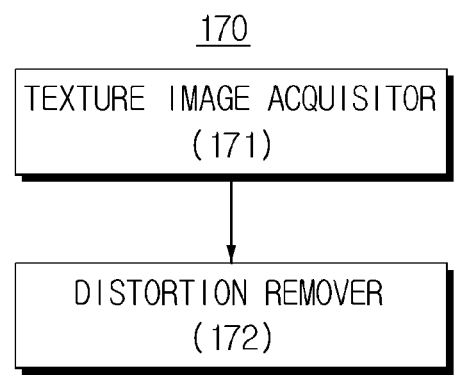
FIGS. 5A and 5B are block diagrams concretely illustrating a texture information production unit illustrated in FIG. 2.
Figure 5B:
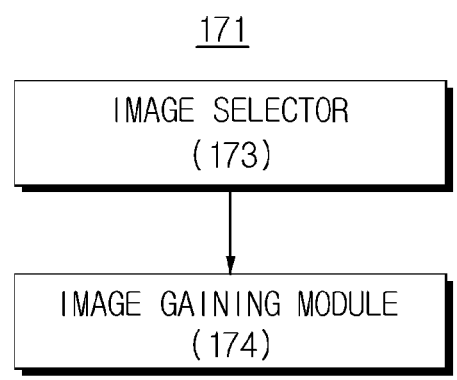

FIG. 1 is a block diagram schematically illustrating a 3-Dimensional (3D) model production apparatus according to an exemplary embodiment of the present invention. FIG. 2 is a block diagram schematically illustrating a construction added to the 3D model production apparatus illustrated in FIG. 1. FIGS. 3A and 3B are block diagrams concretely illustrating a mesh model processing unit illustrated in FIG. 1. FIGS. 4A and 4B are block diagrams concretely illustrating an image matching unit illustrated in FIG. 1. FIGS. 5A and 5B are block diagrams concretely illustrating a texture information production unit illustrated in FIG. 2. The following description will be made with reference to FIGS. 1 to 5.

Referring to FIG. 1, a 3D model production apparatus 100 includes an image matching unit 110, a mesh model processing unit 120, a 3D model processing unit 130, a power unit 140, and a main controller 150.

A method of producing a 3D model having a static background includes a method of producing a 3D model having a static background by using a 3D scanner. The method of producing a 3D model having a static background by using the 3D scanner includes automatically producing a 3D mesh in a dense 3D point cloud obtained through a 3D scanning and performing decimation and refinement in order to remove an unnecessary face. However, since even the 3D mesh produced through the aforementioned process still has the great number of vertexes and faces, it is inconvenient to use the 3D mesh in actual contents. In order to make up for the inconvenience, a method of fitting and a method of interactively modelling a 3D object for a point cloud in order to produce a simple 3D model in the point cloud have been studied, but the methods have a problem that their utilization is limited or a user interface is not intuitive. The 3D scanner in the initial stage was widely used as a tool for accurately 3D-measuring a small object, such as the reverse engineering of a machine component, by using a moire pattern or a laser slit beam. However, according to the development of a scanning technique, Light Detection And Ranging (LiDAR) equipment has also been widely utilized recently as a tool for 3D scanning of a wide aerial or ground region.

The 3D model production apparatus 100 is an apparatus for producing a 3D model having a static background by using a mass point cloud and an image obtained through the 3D scanning. The 3D model production apparatus 100 easily and intuitively models a 3D model based on the 3D-scanned mass point cloud and photographed image of the same region or object through a user's interaction. The 3D scanning for obtaining the point cloud is not limited to one specific method, and does not limit a size of a target object for the 3D modelling.

The image matching unit 110 performs a function of producing a matched image by matching a camera image obtained by photographing a predetermined region to a point cloud obtained by scanning the region. Here, the predetermined region is a place including at least one object and is referred to as a target region hereinafter.

The image matching unit 110 may include a first computing module 111 and a first image generator 112 as illustrated in FIG. 4A. The first computing module 111 performs a function of calculating relation information about a relation between the camera image and the point cloud by recognizing markers arranged in the target region. The first image generator 112 performs a function of producing the matched image based on the relation information.

The mesh model processing unit 120 performs a function of producing the object positioned in the target region as a mesh model. The mesh model processing unit 120 may produce the object as the mesh model by intuitively modelling the object through the user's interaction.

The mesh model processing unit 120 may include an image overlapper 121, a user's input processor 122, a coordinate information processor 123, and a coordinate based model generator 124 as illustrated in FIG. 3A.

The image overlapper 121 performs a function of producing an overlapping image by overlapping the point cloud on the matched image. The image overlapper 121 may produce the overlapping image by using a camera matrix obtained in matching the camera image and the point cloud. The image overlapper 121 may produce the overlapping image by orthographically projecting the camera image by using a graphic library and perspectively projecting the point cloud by using the camera matrix obtained in matching the camera image and the point cloud.

The user's input processor 122 performs a function of detecting user's input related to the object on the overlapping image.

The coordinate information processor 123 performs a function of extracting coordinates information related to selected user's input from the point cloud. The coordinate information processor 123 may include a point group gatherer 125 and a 3D coordinate processor 126 as illustrated in FIG. 3B. The point group gatherer 125 performs a function of collecting point groups positioned within a predetermined distance from the selected input. The 3D coordinate processor 126 performs a function of extracting 3D coordinate information on a vertex factor as coordinate information by using the point group. Here, the point group means a group of points included in the point cloud.

The coordinate based model generator 124 performs a function of producing the mesh model based on the coordinate information.

The 3D model processing unit 130 performs a function of producing a 3D model for the object by reflecting texture information obtained from the matched image to the mesh model.

The power unit 140 performs a function of supplying power to each construction element included in the 3D model production apparatus 100.

The main controller 150 performs a function of controlling all of the operations of each construction element included in the 3D model production apparatus 100.

In the present exemplary embodiment, the camera image and the point cloud may be obtained at the same position, and may also be obtained at different positions.

When the camera image and the point cloud are obtained at the same position, the 3D model production apparatus 100 may further include a camera image obtainment unit 160 as illustrated in FIG. 2. The camera image obtainment unit 160 performs a function of simultaneously obtaining the camera image when obtaining the point cloud by using a camera attached to a scanner.

In the meantime, when the camera image and the point cloud are obtained at the different positions, the image matching unit 110 may further include a appointing module 113, a second computing module 114, a mapping relation processor 115, and a second image generator 116 as illustrated in FIG. 4B. The appointing module 113 performs a function of designating a correspondence relation between a feature point of the camera image and a feature point of the point cloud. The second computing module 114 performs a function of calculating the camera matrix based on the correspondence relation. The mapping relation processor 115 performs a function of setting a mapping relation between the camera image and the point cloud based on the camera matrix. The mapping relation processor 115 may set 2D coordinates of each point of the camera image as the mapping relation by multiplying the camera matrix by 3D coordinates of each point of the point cloud. The second image generator 116 performs a function of producing the matched image based on the mapping relation.

The 3D model production apparatus 100 may further include a texture information production unit 170 as illustrated in FIG. 2. The texture information production unit 170 generates texture information and may include a texture image acquisitor 171 and a distortion remover 172 as illustrated in FIG. 5A. The texture image acquisitor 171 performs a function of obtaining the texture image which is to be reflected to each face of the mesh model from the matched image. The distortion remover 172 performs a function of generating the texture information by removing perspective distortion from the texture image.

In the meantime, the texture image acquisitor 171 may further include an image selector 173 and a image gaining module 174 as illustrated in FIG. 5B. The image selector 173 performs a function of selecting one face of the matched image related to a view vector from the matched image when an angle between a normal line vector and the view vector of the camera in the one face of the mesh model conforms to a predetermined reference. The image gaining module 174 performs a function of obtaining the texture image from the selected one face of the matched image.

The 3D model production apparatus 100 may further include a point cloud production unit 180 as illustrated in FIG. 2. The point cloud production unit 180 performs a function of generating the point cloud by 3D scanning the target region.

Figure 7:
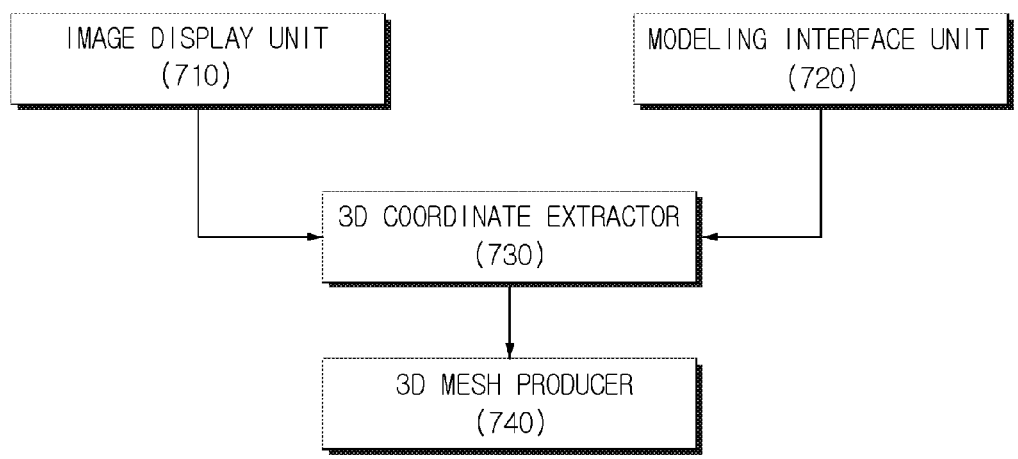
FIG. 7 is a diagram illustrating a modeling unit illustrated in FIG. 6.

Next, a 3D modelling system will be described as an exemplary embodiment of the 3D model production apparatus 100. FIG. 6 is a diagram illustrating a 3D modeling system using a point cloud and an image. FIG. 7 is a diagram illustrating a modeling unit illustrated in FIG. 6. Hereinafter, the 3D modelling system will be described with reference to FIGS. 6 and 7.

The 3D modelling system 600 is a system for producing a 3D model by using a mass 3D point cloud and an image through a user's interaction.

The 3D modelling system 600 produces a 3D mesh by using a feature point of the mass point cloud designated by the user. In this case, the 3D modelling system 600 may enable the user to intuitively produce a 3D model by matching the image and the point cloud and then suggesting the matched image to the user.

The 3D modelling system 600 extracts 3D coordinates of a feature point of a trace of a target object for the modelling, which the user 2-dimensionally draws on an output screen including the image matched with the point cloud, from the point cloud. In this case, the 3D modelling system 600 extracts the 3D coordinates of the feature point by optimizing the points of the point cloud projected closer on the coordinates which the user displays on the image than a threshold and the coordinates in the image by using the camera matrix.

The 3D modelling system 600 matches the mass 3D point cloud and the image, so that the modelled 3D mesh is automatically matched to the image, thereby displaying a modeled result to the user by overlapping the modeled result on the image.

The 3D modelling system 600 extracts a realistic texture from the 3D model modelled by matching the mass 3D point cloud and the image. In this case, the 3D modelling system 600 extracts a texture by determining a part hidden by the modelled 3D model and by a non-modeled foreground object in multiple images photographed in several directions and sampling an image of a non-hidden part. In this case, in a case where the 3D modelling system 600 cannot perform the sampling of the image because the part is hidden by another object in all input images, the 3D modelling system 600 fills out a blank part of the texture by performing the sampling in a currently generated texture.

According to FIG. 6, the 3D modelling system 600 includes a point cloud input unit 610, an image input unit 620, an image-point cloud matching unit 630, a modelling unit 640, a texture extraction unit 650, and a 3D model output unit 660.

The point cloud input unit 610 and the image input unit 620 perform a function of inputting a point cloud and an image stored in a computer, respectively. The image-point cloud matching unit 630 performs a function of extracting a camera parameter of the image by matching the image and the point cloud. The modelling unit 640 performs a function of producing a 3D mesh model through a user's interaction. The texture extraction unit 650 performs a function of extracting a texture of each face of the 3D mesh from the matched image. The 3D model output unit 660 performs a function of outputting the 3D mesh model overlapping with the texture as a computer file and through a screen of the computer.

According to FIG. 7, the modelling unit 640 includes an image display unit 710, a modelling interface unit 720, a 3D coordinate extractor 730, and a 3D mesh producer 740.

The image display unit 710 performs a function of displaying the image and the point cloud to the user by overlapping the image and the point cloud by using the camera matrix obtained as a result of a processing by the image-point cloud matching unit 630. That is, the image display unit 710 performs a function of displaying the image and the point cloud by overlapping the point cloud on the matched image after the matching process has been performed by the image-point cloud matching unit 630. The modelling interface unit 720 performs a function of receiving a user's motion of drawing a model for a target object for the 3D modelling in the image display unit 710. The 3D coordinate extractor 730 performs a function of extracting 3D coordinates of a vertex factor that is a significant factor in the 3D modelling from the point cloud based on the user's input. The 3D mesh producer 740 performs a function of producing a mesh by using the 3D coordinates of the vertex.

A point cloud obtained by 3D scanning a target place for the 3D modelling and images of the target place photographed in multiple positions are stored in the computer and are input through the point cloud input unit 610 and the image input unit 620. Depending on 3D scanning equipment, a result of the matching of the point cloud and the image may be displayed after the scanning and the image photographing by attaching the camera to a main body of a scanner, and pre-calculating a relation between the point cloud and the image by attaching specially designed markers to the background region before the scanning operation and performing the scanning and the image photography. However, since the aforementioned advance operation cannot be performed on the image photographed at a predetermined position by the user, the operation is required to be performed after the scanning and the image photographing. The image-point cloud matching unit 630 enables the user to designate the relation between the characteristic of the image and the characteristic of the point cloud and calculates the camera matrix based on which the mapping relation between the 3D points of the point cloud and the image may be set by using the designated correspondence relation. When the camera matrix is multiplied by 3D coordinates of one point of the point cloud, 2D coordinates in the image may be recognized. The image display unit 710 of the modelling unit 640 displays the image and the point cloud on the screen by overlapping the point cloud on the image by using the camera matrix calculated in the image-point cloud matching unit 630. The image display unit 710 displays the image and the point cloud by overlapping the point cloud on the image by orthographically projecting the image by using a general-use 3D graphic library, such as OpenGL, and perspectively projecting the point cloud by converting the camera matrix into the camera parameter of the 3D graphic library. In this case, when there are a great number of point clouds, the image and the point cloud are displayed on the screen without causing the user to feel the delay through a method of improving a rate of rendering to the screen by hierarchically or spatially dividing the point clouds. When the image is output on the monitor of the computer, the user draws the target object for the modelling on the image by using a tool, such as a mouse or a tablet. The modelling interface unit 720 converts coordinates input by the user on the screen into coordinates of the image and inputs the converted coordinates to the 3D coordinate extractor 730. The 3D coordinate extractor 730 extracts 3D coordinates by collecting and optimizing a set of points projected within a predetermined distance from the coordinates of the image input from the modelling interface unit 720. The 3D coordinates is utilized as the 3D coordinates of the vertex in the 3D mesh producer 740. The 3D mesh producer 740 produces the mesh by generating connection information about the 3D vertexes. The 3D mesh producer 740 is related with the modelling interface unit 720. A corresponding interface is supported through the modelling interface unit 720 according to the method of producing and editing the mesh by the 3D mesh producer 740. For example, when the 3D mesh producer 740 supports a mesh edition, such as face division and face extrusion, the modelling interface unit 720 is required to provide an interface for drawing a division line for dividing a face, selection of a face, and movement. The texture extraction unit 650 extracts a texture of each face of the mesh from the 3D mesh model produced in the modelling unit 640. Since the image is matched with the point cloud, the 3D mesh produced using the matched image and point cloud is also matched to the image. Accordingly, a texture image is produced by selecting the most appropriate image for each face of the mesh and sampling a corresponding part. In this case, a perspective distortion of the image is removed. A reference for selecting a source image for the production of the texture image is to select an image in which an angle between a normal line vector of a corresponding face and the view vector of the camera is closer to 180°, i.e., an image of which a face is photographed to be closest to a front surface. Information about the hiding by the 3D modelled object or a non-modelled object, such as a tree, may also be used. The 3D mesh model processed in the texture extraction unit 650 is output in various forms, such as a computer file for the screen and an application through the 3D model output unit 660.

Figure 8:
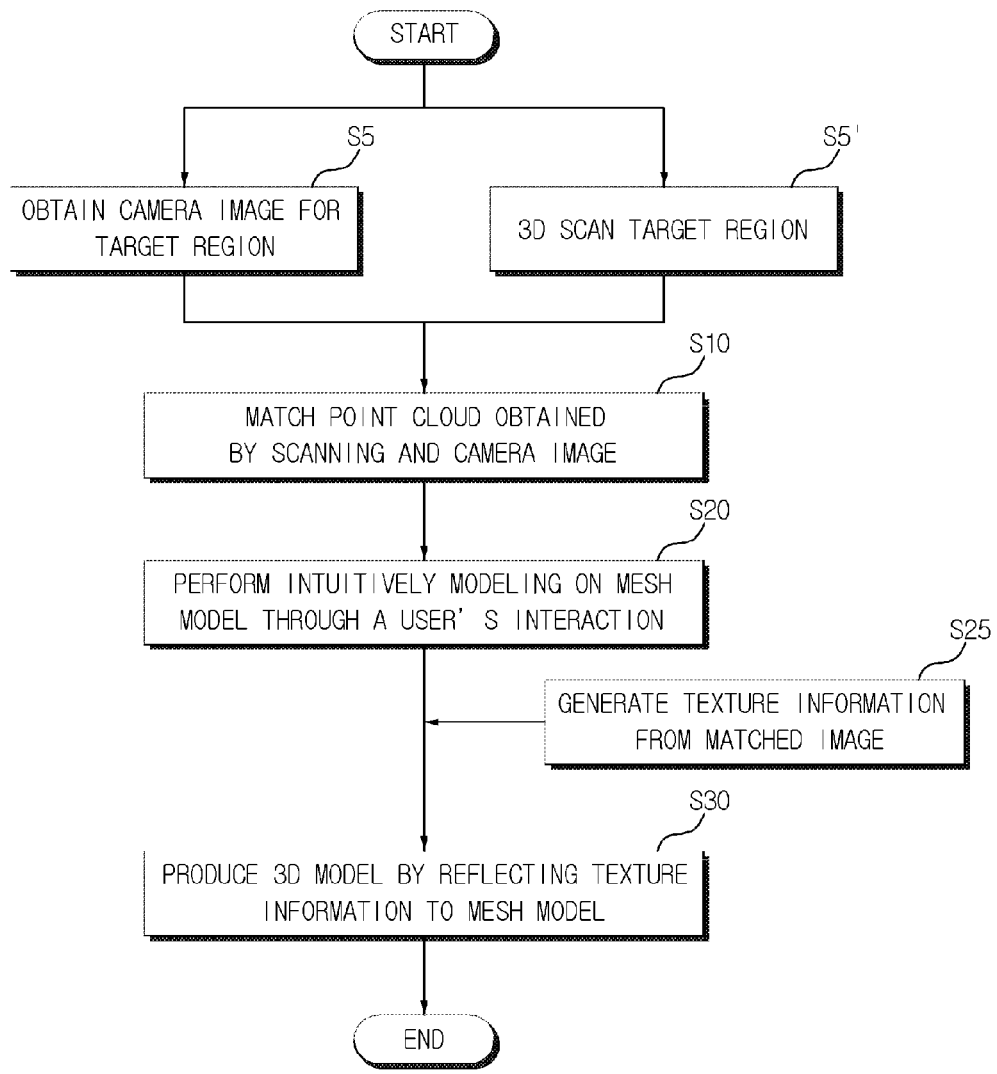
FIG. 8 is a flowchart illustrating a 3D model production method according to an exemplary embodiment of the present invention.

Next, a 3D model production method of the 3D model production apparatus 100 will be described. FIG. 8 is a flow-chart illustrating the 3D model production method according to an exemplary embodiment of the present invention. Hereinafter, the 3D model production method will be described with reference to FIG. 8.

First, the image matching unit produces a matched image by matching a point cloud obtained by scanning a target region to a camera image obtained by photographing the target region (S10).

Step S10 may be concretely performed as follows. First, the first computing module recognizes markers arranged in the target region and calculates relation information about a relation between the camera image and the point cloud. Then, the relation-based image producer produces the matched image based on the relation information.

After step S10, the mesh model processing unit produces an object positioned in the target region as a mesh model (S20). In step S20, the mesh model processing unit may produce the object as the mesh model by intuitively modelling the object through a user's interaction.

Step S20 may be concretely performed as follows. First, the image overlapper produces an overlapping image by overlapping the point cloud on the matched image. At this stage, the image overlapper may produce the overlapping image by using a camera matrix obtained in the matching of the camera image and the point cloud. At this stage, the image overlapper may produce the overlapping image by orthographically projecting the camera image by using a graphic library and perspectively projecting the point cloud by using the camera matrix obtained in the matching of the camera image and the point cloud. Then, the user's input processor detects user's input related to the object from the overlapping image. Then, the coordinate information processor extracts coordinates information related to a selected user's input from the point cloud. At this stage, the point group gatherer may collect point groups positioned within a predetermined distance from the selected input and the point group coordinate extractor may extract 3D coordinate information on a vertex factor as the coordinate information by using the collected point groups. Then, the coordinate based model generator produces the mesh model based on the coordinate information.

After step S20, the 3D model producer produces the 3D model for the object by reflecting texture information obtained from the matched image to the mesh model (S30).

In the production of the 3D model, the camera image and the point cloud may be obtained at the same position, and the camera image and the point cloud may also be obtained at different positions. In the former case, before step S10, the camera image obtainment unit may simultaneously obtain the point cloud when obtaining the point cloud by using the camera attached to the scanner (S5). In the latter case, step S10 may be performed as follows. First, the appointing module designates the correspondence relation between a feature point of the camera image and a feature point of the point cloud. Then, the second computing module calculates the camera matrix based on the correspondence relation. Then, the mapping relation processor sets the mapping relation between the camera image and the point cloud based on the camera matrix. At this stage, the mapping relation processor may set 2D coordinates of each point of the camera image as a mapping relation by multiplying the camera matrix by 3D coordinates of each point of the point cloud. Then, the mapping first image generator produces the matched image based on the mapping relation.

Between steps S20 and S30, step S25 of generating texture information by the texture information production unit may be performed. That is, the texture image acquisitor obtains a texture image to be reflected to each face of the mesh model from the matched image. Then, the distortion remover generates the texture information by removing perspective distortion from the texture image. The step of obtaining the texture image may be concretely performed as follows. First, when an angle between a normal line vector in one face of the mesh model and a view vector of the camera conforms to a predetermined reference, the image selector selects one face of the matched image related to the view vector from the matched image. Then, the image gaining module obtains the texture image from the selected one face of the matched image.

Before step S10, the point cloud production unit may generate the point cloud by 3D scanning the target region (S5'). Step S5' may be simultaneously performed with step S5, but the performance of step S5' before or after step S5 is accepted.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for producing a 3D model, comprising:
   an image matching unit configured to produce a matched image by matching a point cloud obtained by scanning a predetermined region to a camera image obtained by photographing the predetermined region;
   a mesh model processing unit configured to produce a mesh model of the object;
   a 3D model processing unit configured to produce a 3D model of the object by reflecting texture information obtained from the matched image to the mesh model; and
   main controller hardware configured to control the operations of the image matching unit, the mesh model processing unit, and the 3D model processing unit,
   wherein the mesh model processing unit is configured to extract coordinate information related to a user's input from the point cloud and produce the mesh model based on the coordinate information.

2. The apparatus of claim 1, wherein the mesh model processing unit comprises:
   an image overlapper configured to produce an overlapping image by overlapping the point cloud on the matched image;
   a user's input processor configured to detect the user's input related to the object from the overlapping image;
   a coordinate information processor configured to extract coordinate information related to the user's input from the point cloud; and
   a coordinate-based model generator configured to produce the mesh model based on the coordinate information.

3. The apparatus of claim 2, wherein the image overlapper produces the overlapping image by using a camera matrix obtained by matching the camera image and the point cloud.

4. The apparatus of claim 2, wherein the image overlapper is configured to produce the overlapping image by orthographically projecting the camera image by using a graphic library and perspectively projecting the point cloud by using a camera matrix obtained in the matching of the camera image and the point cloud.

5. The apparatus of claim 2, wherein the coordinate information processor comprises:
   a point group gatherer configured to collect point groups positioned within a predetermined distance from the user's input; and
   a 3D coordinate processor configured to extract 3D coordinate information on a vertex factor as the coordinate information by using the point group.

6. The apparatus of claim 1, wherein the image matching unit comprises:
   a first computing module configured to calculate relation information between the camera image and the point cloud by recognizing a plurality of markers arranged in the predetermined region; and
   a first image generator configured to produce the matched image based on the relation information.

7. The apparatus of claim 1, further comprising:
   a camera image obtainment unit configured to simultaneously obtain the camera image when obtaining the point cloud by using a camera attached to a scanner.

8. An apparatus for producing a 3D model, comprising:
   an image matching unit configured to produce a matched image by matching a point cloud obtained by scanning a predetermined region to a camera image obtained by photographing the predetermined region;

a mesh model processing unit configured to produce a mesh model of the object;

a 3D model processing unit configured to produce a 3D model of the object by reflecting texture information obtained from the matched image to the mesh model; and main controller hardware configured to control the operations of the image matching unit, the mesh model processing unit, and the 3D model processing unit, wherein the image matching unit comprises:

an appointing module configured to designate a correspondence relation between a feature point of the camera image and a feature point of the point cloud;

a second computing module configured to calculate a camera matrix based on the correspondence relation;

a mapping relation processor configured to set a mapping relation between the camera image and the point cloud based on the camera matrix; and a second image generator configured to produce the matched image based on the mapping relation.

9. The apparatus of claim 8, wherein the mapping relation processor is configured to set 2D coordinates of each point of the camera image as the mapping relation by multiplying the camera matrix by 3D coordinates of each point of the point cloud.

10. The apparatus of claim 1, further comprising:

a texture information production unit configured to generate the texture information, wherein the texture information production unit comprises:

a texture image acquisitor configured to obtain a texture image from the matched image to be reflected to each of a plurality of faces of the mesh model; and a distortion remover configured to generate the texture information by removing perspective distortion from the texture image.

11. The apparatus of claim 10, wherein the texture image acquisitor comprises:

an image selector configured to select a selected face of the matched image related to the view vector from the matched image when an angle between a normal line vector of the selected face of the mesh model and a view vector conforms to a predetermined reference; and a image gaining module configured to obtain the texture image from the selected face of the matched image.

12. The apparatus of claim 1, further comprising:

a point cloud production unit configured to generate the point cloud by 3D scanning the predetermined region.

13. The apparatus of claim 1, wherein the mesh model processing unit is configured to produce the object as the mesh model by intuitively modeling the object through a user's interaction.

14. A method of producing a 3D model using main controller hardware, comprising:

producing a matched image by matching a point cloud obtained by scanning a predetermined region to a camera image obtained by photographing the predetermined region, the matched image including an object;

producing a mesh model of the object based on coordinate information; and producing a 3D model of the object by reflecting texture information obtained from the matched image to the mesh model, wherein producing the mesh model includes:

extracting the coordinate information related to a user's input from the point cloud; and producing the mesh model based on the coordinate information.

15. The method of claim 14, wherein producing the mesh model includes:

overlapping the point cloud and the matched image to produce an overlapping image;

detecting the user's input in relation to the overlapping image; and extracting the coordinate information related to the user's input from the point cloud.

16. The method of claim 15, wherein extracting the coordinate information comprises:

collecting point groups positioned within a predetermined distance from the user's input; and extracting point group based coordinate information by extracting 3D coordinate information on a vertex factor.

17. The method of claim 14, wherein producing the matched image comprises:

calculating relation information about a relation between the camera image and the point cloud by recognizing markers in the predetermined region; and producing the matched image based on the relation information.

18. The method of claim 14, further comprising:

obtaining the camera image simultaneously with the point cloud by using a camera attached to a 3D scanner, or wherein the image matching comprises:

designating a correspondence relation between a feature point of the camera image and a feature point of the point cloud;

calculating a camera matrix based on the correspondence relation;

setting a mapping relation between the camera image and the point cloud based on the camera matrix; and producing a mapping relation based image by producing the matched image based on the mapping relation.

19. The method of claim 14, further comprising:

selecting an image by selecting a face of the mesh model when an angle between a line normal to the face of the mesh model and a view vector conforms to a predetermined reference;

obtaining a texture image from the selected face of the matched image; and generating texture information by removing perspective distortion from the texture image of the matched image.

* * * * *